(12) United States Patent
Guo et al.

(10) Patent No.: US 8,923,610 B2
(45) Date of Patent: Dec. 30, 2014

(54) IMAGE PROCESSING APPARATUS, IMAGE PROCESSING METHOD, AND COMPUTER READABLE MEDIUM

(75) Inventors: Jin Guo, Chicago, IL (US); Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 411 days.

(21) Appl. No.: 13/285,543

(22) Filed: Oct. 31, 2011

(65) Prior Publication Data
US 2012/0257822 A1 Oct. 11, 2012

(30) Foreign Application Priority Data
Apr. 6, 2011 (JP) ................................. 2011-084802

(51) Int. Cl.
*G06K 9/34* (2006.01)
*H04N 1/387* (2006.01)
*G06T 7/00* (2006.01)

(52) U.S. Cl.
CPC .............. *G06T 7/0085* (2013.01); *H04N 1/387* (2013.01); *G06T 7/0097* (2013.01); *G06T 2207/10024* (2013.01)
USPC .......................................... 382/164; 382/173

(58) Field of Classification Search
None
See application file for complete search history.

(56) References Cited

U.S. PATENT DOCUMENTS

| | | | |
|---|---|---|---|
| 6,466,700 B1* | 10/2002 | Makram-Ebeid | 382/265 |
| 7,043,080 B1* | 5/2006 | Dolan | 382/199 |
| 2002/0085116 A1* | 7/2002 | Kuwano et al. | 348/465 |
| 2002/0146173 A1* | 10/2002 | Herley | 382/199 |
| 2002/0164085 A1* | 11/2002 | Norimatsu | 382/275 |
| 2004/0022437 A1* | 2/2004 | Beardsley | 382/199 |
| 2004/0131256 A1* | 7/2004 | Fujieda et al. | 382/199 |
| 2004/0165786 A1* | 8/2004 | Zhang et al. | 382/276 |
| 2005/0169531 A1* | 8/2005 | Fan | 382/199 |
| 2005/0196037 A1* | 9/2005 | Muenzenmayer et al. | 382/159 |
| 2007/0110319 A1* | 5/2007 | Wyatt et al. | 382/199 |
| 2008/0056562 A1* | 3/2008 | Hosoi | 382/155 |
| 2011/0050918 A1* | 3/2011 | Tachi | 348/208.4 |
| 2012/0008821 A1* | 1/2012 | Sharon et al. | 382/100 |

FOREIGN PATENT DOCUMENTS

| | | | |
|---|---|---|---|
| JP | 2000-011188 A | | 1/2000 |
| JP | 2002-057879 A | | 2/2002 |
| JP | 2005-122328 A | | 5/2005 |
| JP | 2005-269449 A | | 9/2005 |

* cited by examiner

*Primary Examiner* — Jingge Wu
(74) *Attorney, Agent, or Firm* — Sughrue Mion, PLLC

(57) ABSTRACT

An image processing apparatus includes a calculating unit, an edge-position detecting unit, an identifying unit, and a subject-region detecting unit. For each color separation image, the calculating unit calculates a gradient direction of an edge gradient and an edge intensity at each position on the basis of a color captured image. The edge-position detecting unit detects edge positions in each color separation image on the basis of the gradient directions of the edge gradients and the edge intensities. For each position, the identifying unit identifies the gradient direction of the edge gradient and the edge intensity at the position in one of the plural color separation images that includes the largest edge intensity at the position. The subject-region detecting unit detects a subject region on the basis of the detected edge positions, the identified gradient directions of the edge gradients, and the identified edge intensities.

12 Claims, 6 Drawing Sheets

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-084802 filed Apr. 6, 2011.

BACKGROUND (i) Technical Field

The present invention relates to an image processing apparatus, an image processing method, and a computer readable medium.

SUMMARY

According to an aspect of the invention, there is provided an image processing apparatus including a calculating unit, an edge-position detecting unit, an identifying unit, and a subject-region detecting unit. The calculating unit calculates, for each of plural color separation images, a gradient direction of an edge gradient and an edge intensity at each position on the basis of a color captured image. The plural color separation images result from separation of the color captured image into multiple color components. The color captured image includes an image of a subject captured with an imaging apparatus. The edge-position detecting unit detects edge positions in each of the plural color separation images, on the basis of the gradient directions of the edge gradients and the edge intensities calculated by the calculating unit. The identifying unit identifies, for each position, the gradient direction of the edge gradient and the edge intensity at the position in a color separation image among the plural color separation images that includes the largest edge intensity at the position. The subject-region detecting unit detects a subject region on the basis of the edge positions detected by the edge-position detecting unit and the gradient directions of the edge gradients and the edge intensities identified by the identifying unit. The subject region is a portion of the color captured image that corresponds to the image of the subject.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described in detail below with reference to the accompanying drawings.

Figure 1:
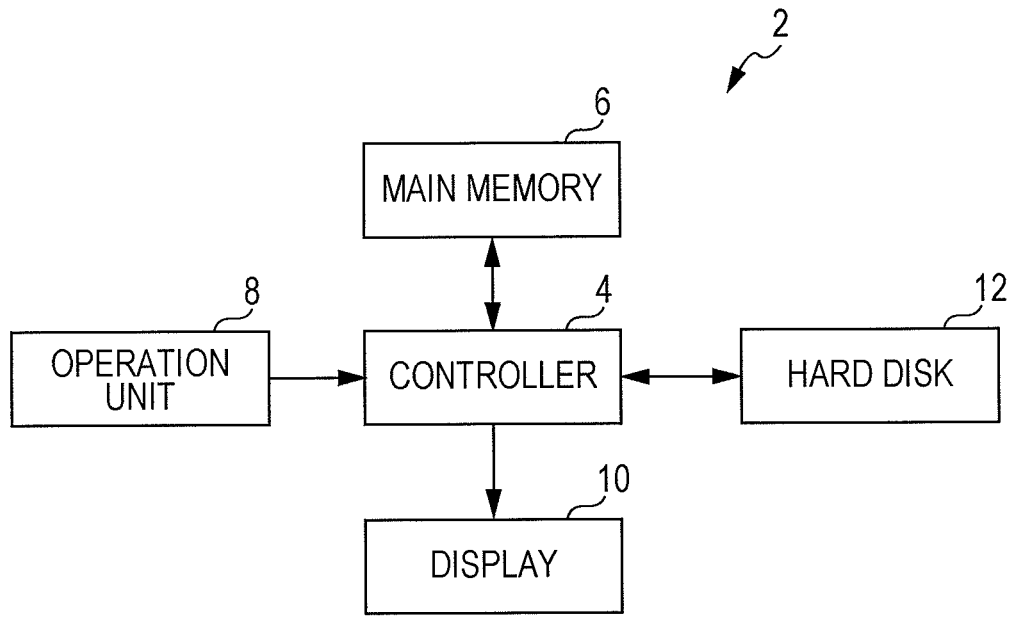
FIG. 1 is a diagram illustrating a configuration of an image processing apparatus.

FIG. 1 is a diagram illustrating a configuration of an image processing apparatus 2 according to an exemplary embodiment of the present invention. The image processing apparatus 2, e.g., a personal computer, includes a controller 4, a main memory 6, an operation unit 8, a display 10, and a hard disk 12. In addition to those components, the image processing apparatus 2 includes a network interface for exchanging data with a network, and an input/output (I/O) interface for exchanging data with an external apparatus (e.g., a digital camera).

The controller 4, e.g., a microprocessor, executes information processing in accordance with a program stored in the main memory 6. The main memory 6 includes a random access memory (RAM) and a read only memory (ROM). The main memory 6 stores the program. This program may be read out from a computer readable information storage medium, such as a digital versatile disc (DVD) (registered trademark)-ROM, and stored in the main memory 6, or may be supplied from a communication network, such as a network, and stored in the main memory 6. The main memory 6 also stores various types of data that are needed in the information processing.

The operation unit 8, e.g., a mouse and a keyboard, is an interface that allows a user to operate the image processing apparatus 2. The operation unit 8 outputs, to the controller 4, information that indicates content of an operation performed by the user. The display 10, e.g., a liquid crystal display, displays information input by the controller 4.

The hard disk 12 is a storage medium for storing various kinds of information. The hard disk 12 stores a base image that represents a color image captured with a digital camera (imaging apparatus). This base image is supplied from the digital camera that has captured an image of a subject, via the I/O interface. Here, the base image includes pixel values of individual pixels (positions). Each pixel value includes multiple color-component values, i.e., a value of a luminance component Y (hereinafter, referred to as a Y-value), a value of a first color-difference component Cb (hereinafter, referred to as a Cb-value), and a value of a second color-difference component Cr (hereinafter, referred to as a Cr-value).

Figure 2:
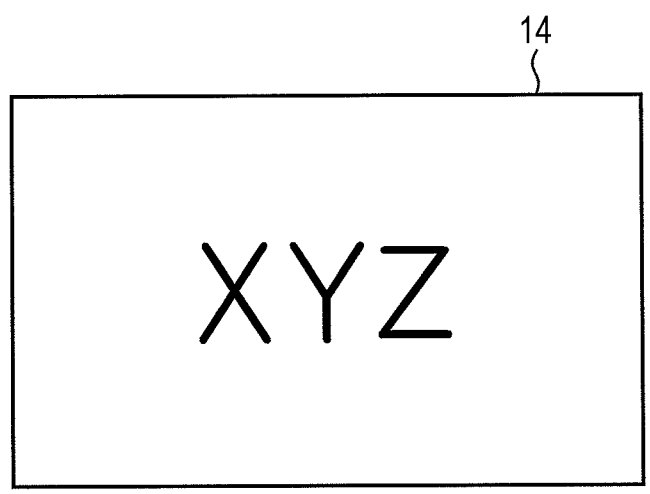
FIG. 2 is a diagram illustrating a whiteboard.

In this exemplary embodiment, an image of a whiteboard 14 placed on a wall is captured with a digital camera. FIG. 2 illustrates the whiteboard 14. As illustrated in the figure, the whiteboard 14 has a horizontally long rectangular shape. Also as illustrated in the figure, alphabets "X", "Y", and "Z" are written on the whiteboard 14.

When a user performs a predetermined subject extraction operation, the image processing apparatus 2 reads out a base image and generates a captured image. A captured image refers to a reduced-size image of the base image, and includes pixel values of individual pixels (positions). As in the base image, each pixel value includes a Y-value, a Cb-value, and a Cr-value.

Figure 3:
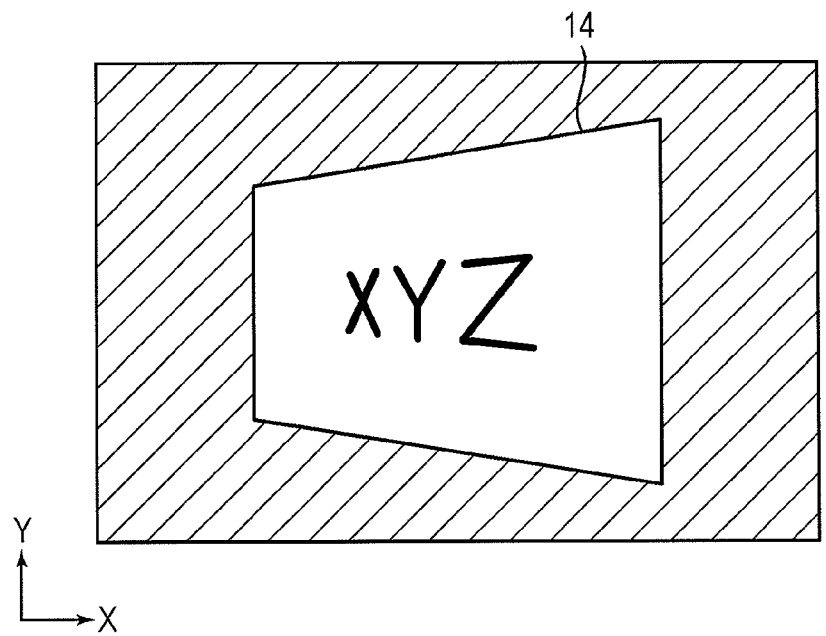
FIG. 3 is a diagram illustrating a captured image.

FIG. 3 illustrates the captured image. It is assumed herein that an image of the whiteboard 14 is captured from the right side, from in front of the whiteboard 14. As illustrated in the figure, the captured image includes the image of the whiteboard 14. A hatched portion represents the wall. The x-coordinate axis and the y-coordinate axis are set for the captured image, and each pixel is identified by coordinate values. Meanwhile, the aforementioned base image is similar to the captured image illustrated in FIG. 3 but has a different image size.

Figure 4:
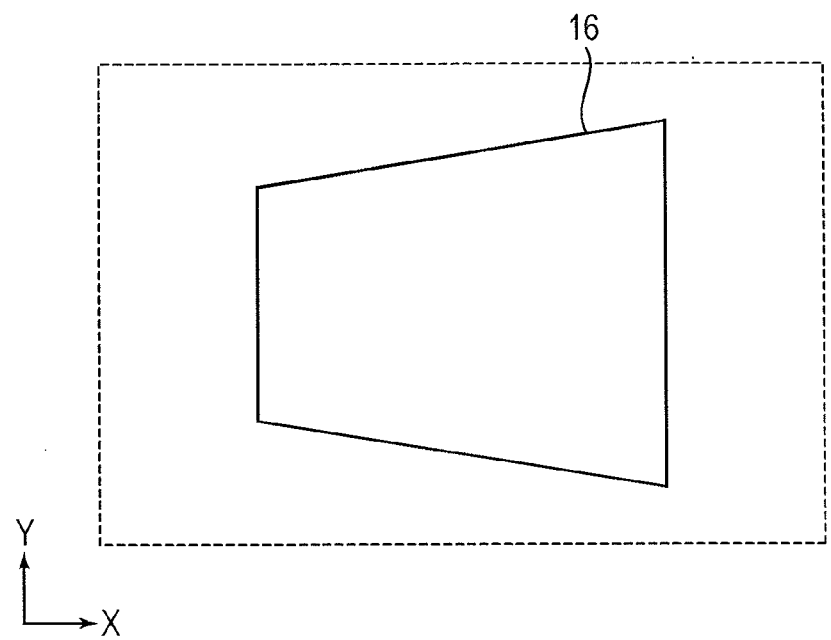
FIG. 4 is a diagram illustrating a subject region.

When a user performs a subject extraction operation, the image processing apparatus 2 not only generates the captured image but also detects a subject region 16 that corresponds to the image of the whiteboard 14 from the captured image, generates an image of the whiteboard 14 viewed from the front on the basis of the subject region 16, and displays the generated image on the display 10. FIG. 4 illustrates the subject region 16.

In this image processing apparatus 2, the accuracy of detecting the subject region 16 in a subject extraction operation is improved. This improvement will be described below.

Figure 5:
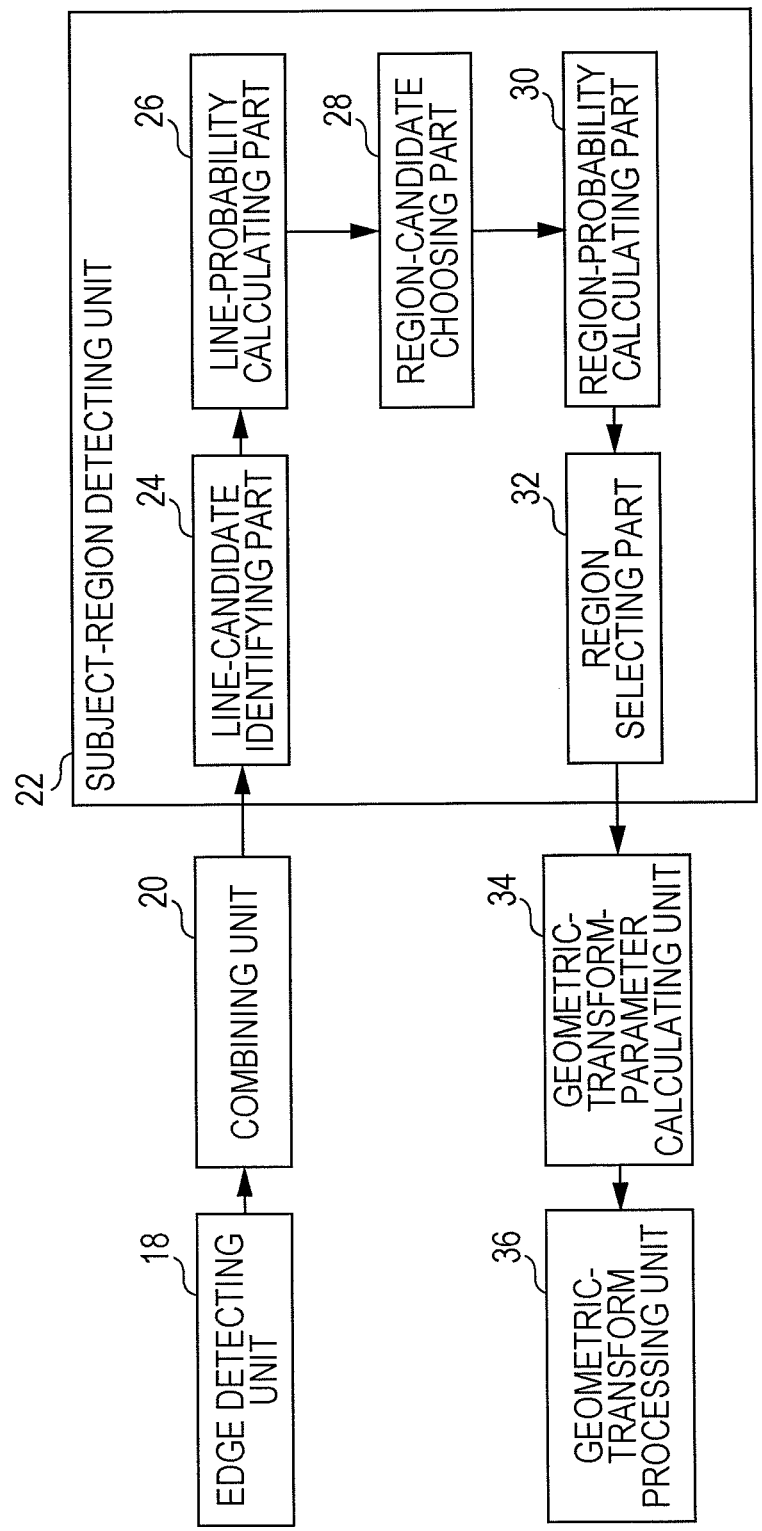
FIG. 5 is a functional block diagram illustrating functions implemented in the image processing apparatus.

FIG. 5 is a functional block diagram illustrating functions implemented in the image processing apparatus 2. As illustrated in the figure, the image processing apparatus 2 includes an edge detecting unit 18, a combining unit 20, a subject-region detecting unit 22, a geometric-transform-parameter calculating unit 34, and a geometric-transform processing unit 36. The subject-region detecting unit 22 includes a line-candidate identifying part 24, a line-probability calculating part 26, a region-candidate choosing part 28, a region-probability calculating part 30, and a region selecting part 32. The controller 4 operates in accordance with the aforementioned program in response to a subject extraction operation, whereby these functions are implemented.

The edge detecting unit 18 (calculating unit) first performs a color separation process on the captured image, thereby separating the captured image into three color components and generating three color separation images, i.e., a first color separation image, a second color separation image, and a third color separation image. Each color separation image includes pixel values of individual pixels. A pixel value of a given pixel included in the first color separation image represents a Y-value of a pixel value of the corresponding pixel included in the captured image. A pixel value of a given pixel included in the second color separation image represents a Cb-value of a pixel value of the corresponding pixel included in the captured image. A pixel value of a given pixel included in the third color separation image represents a Cr-value of a pixel value of the corresponding pixel included in the captured image.

After generating the three color separation images in this way, the edge detecting unit 18 executes an edge detection process on each of the color separation images.

First, the edge detecting unit 18 (calculating unit) calculates, for each color separation image, a gradient direction θ of an edge gradient and an edge intensity I at each pixel.

More specifically, for each color separation image, the edge detecting unit 18 calculates an x-direction edge gradient Gx and a y-direction edge gradient Gy at each pixel using the Sobel filter. The edge detecting unit 18 then calculates a gradient direction θ and an edge intensity I at a given pixel on the basis of the x-direction edge gradient Gx and the y-direction edge gradient Gy at the pixel. The gradient direction θ and the edge intensity I are represented by the Equations below.

$$\theta = \tan^{-1}(Gy/Gx)$$

$$I = (Gx^2 + Gy^2)^{1/2}$$

As a result, a first edge gradient image that represents gradient directions θ at individual pixels of the first color separation image, a second edge gradient image that represents gradient directions θ at individual pixels of the second color separation image, and a third edge gradient image that represents gradient directions θ at individual pixels of the third color separation image are generated. A pixel value of a given pixel included in the first edge gradient image represents a gradient direction θ at the corresponding pixel of the first color separation image. A pixel value of a given pixel included in the second edge gradient image represents a gradient direction θ at the corresponding pixel of the second color separation image. A pixel value of a given pixel included in the third edge gradient image represents a gradient direction θ at the corresponding pixel of the third color separation image.

Additionally, a first edge intensity image that represents edge intensities I at individual pixels of the first color separation image, a second edge intensity image that represents edge intensities I at individual pixels of the second color separation image, and a third edge intensity image that represents the edge intensities I at individual pixels of the third color separation image are generated. A pixel value of a given pixel included in the first edge intensity image represents an edge intensity I at the corresponding pixel of the first color separation image. A pixel value of a given pixel included in the second edge intensity image represents an edge intensity I at the corresponding pixel of the second color separation image. A pixel value of a given pixel included in the third edge intensity image represents an edge intensity I at the corresponding pixel of the third color separation image.

The edge detecting unit 18 (edge-position detecting unit) detects edge pixels (edge positions) in the individual color separation images on the basis of the three edge intensity images and the three edge gradient images.

Figure 6A:
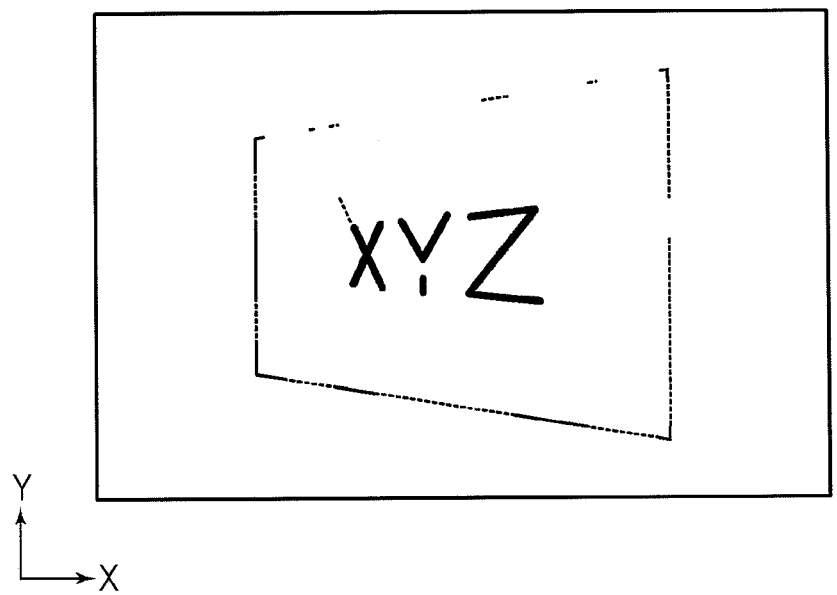
FIG. 6A is a diagram illustrating a first edge image.

More specifically, the edge detecting unit 18 detects edge pixels in the first color separation image on the basis of the first edge intensity image and the first edge gradient image. More specifically, the edge detecting unit 18 detects edge pixels from the first color separation image using the Canny method. Here, an edge pixel refers to a pixel having an edge intensity that is the local maxima in the gradient direction. The edge detecting unit 18 then generates a first edge image. The first edge image is a binary image, and each pixel value of the first edge image indicates "0" or "1". A pixel value of an edge pixel is "1", whereas a pixel value of a non-edge pixel is "0". FIG. 6A illustrates the first edge image.

Figure 6B:
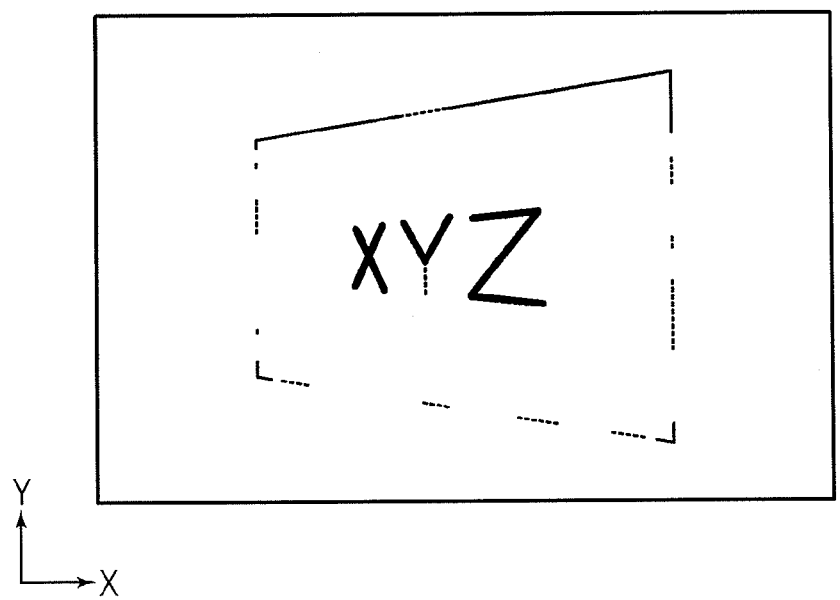
FIG. 6B is a diagram illustrating a second edge image.

Similarly, the edge detecting unit 18 detects edge pixels in the second color separation image on the basis of the second edge intensity image and the second edge gradient image, and generates a second edge image, which is a binary image. Each pixel value of the second edge image indicates "0" or "1". A pixel value of an edge pixel is "1", whereas a pixel value of a non-edge pixel is "0". FIG. 6B illustrates the second edge image.

Figure 6C:
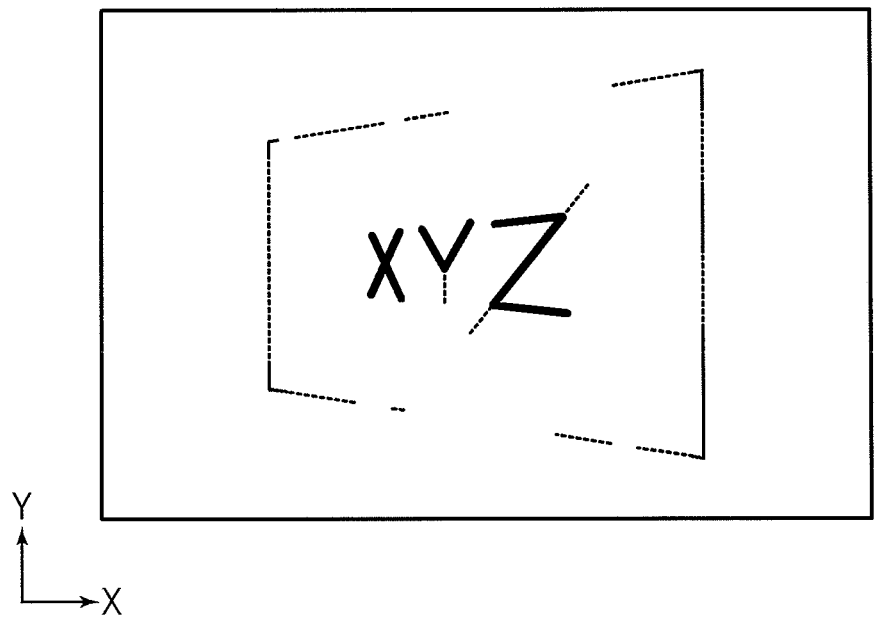
FIG. 6C is a diagram illustrating a third edge image.

Likewise, the edge detecting unit 18 detects edge pixels in the third color separation image on the basis of the third edge intensity image and the third edge gradient image and generates a third edge image, which is a binary image. Each pixel value of the third edge image indicates "0" or "1". A pixel value of an edge pixel is "1", whereas a pixel value of a non-edge pixel is "0". FIG. 6C illustrates the third edge image.

Figure 7:
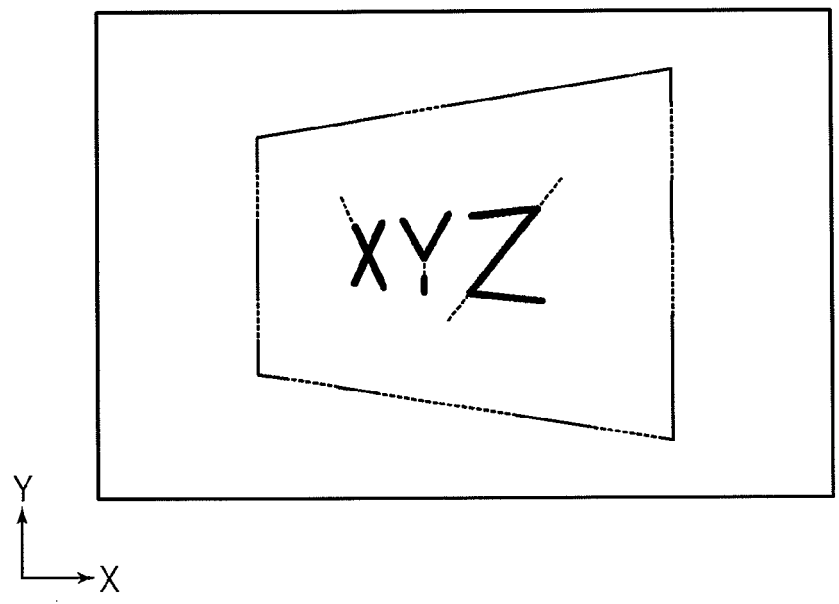
FIG. 7 is a diagram illustrating a combined edge image.

The combining unit 20 generates a combined edge image of the first edge image, the second edge image, and the third edge image by performing logical addition. A pixel having a pixel value "1" serves as an edge pixel. FIG. 7 illustrates the combined edge image.

Additionally, the combining unit 20 (identifying unit) generates a combined edge intensity image of the first edge intensity image, the second edge intensity image, and the third edge intensity image. A pixel value of a given pixel in the combined edge intensity image represents an edge intensity I at the corresponding pixel in an edge intensity image among the first, second, and third edge intensity images that includes the largest edge intensity I represented by the pixel value of the corresponding pixel. When generating the combined edge intensity image, the combining unit 20 (identifying unit) identifies, for each pixel, the largest edge intensity of the edge intensity I represented by the pixel value of the first edge intensity image, the edge intensity I represented by the pixel value of the second edge intensity image, and the edge intensity I represented by the pixel value of the third edge intensity image.

Additionally, the combining unit 20 (identifying unit) generates a combined edge gradient image of the first edge gradient image, the second edge gradient image, and the third edge gradient image. A pixel value of a given pixel in the combined edge gradient image represents a gradient direction θ represented by the pixel value of the corresponding pixel in the first edge gradient image if the pixel value of the corresponding pixel in the first edge intensity image represents the largest edge intensity I. If the pixel value of the corresponding pixel in the second edge intensity image represents the largest edge intensity I, the pixel value of the given pixel of the combined edge gradient image represents a gradient direction θ represented by the pixel value of the corresponding pixel in the second edge gradient image. If the pixel value of the corresponding pixel of the third edge intensity image represents the largest edge intensity I, the pixel value of the given pixel of the combined edge gradient image represents a gradient direction θ represented by the pixel value of the corresponding pixel in the third edge gradient image. When generating the combined edge gradient image, the combining unit 20 (identifying unit) identifies, for each pixel, an maximum edge intensity image MAX that includes the largest edge intensity I represented by the pixel value of the pixel, among the first edge intensity image, the second edge intensity image, and the third edge intensity image. If the maximum edge intensity image MAX is the N-th (N=1 to 3) edge intensity image, the combining unit 20 (identifying unit) identifies the gradient direction θ represented by the pixel value of the corresponding pixel in the N-th edge gradient image.

When the combined edge intensity image includes pixels having the edge intensity I that is smaller than or equal to a threshold intensity (hereinafter, referred to as removal-target pixels), pixel values of the removal-target pixels are removed from the combined edge image, the combined edge intensity image, and the combined edge gradient image in order to avoid the influence of noise.

The subject-region detecting unit 22 (subject-region detecting unit) detects the subject region 16 in the captured image on the basis of the combined edge intensity image, the combined edge gradient image, and the edge pixels indicated by the combined edge image.

First, the line-candidate identifying part 24 (line-candidate identifying part) performs the Hough transform on each edge pixel indicated by the combined edge image, thereby identifying plural line candidates 1 that will serve as candidates of lines constituting a contour of the subject region 16.

For example, the line-candidate identifying part 24 performs the Hough transform on each of the edge pixels indicated by the combined edge image to determine as many curves r(θ) as the number of edge pixels. Here, the curve r(θ) is represented by the Equation below.

$$r(\theta) = x0 \times \cos\theta + y0 \times \sin\theta$$

Here, "x0" denotes an x-coordinate value of the edge pixel, whereas "y0" denotes a y-coordinate value of the edge pixel.

For each of "M (M is a positive integer)" target angular ranges, which are obtained by equally dividing an angular range from $-\pi$ to $+\pi$ by "M", the line-candidate identifying part 24 identifies coordinate values (results of the Hough transform) of intersection points of at least a predetermined number of curves in the Hough space, and identifies the line candidates 1 from the identified coordinate values.

The line-candidate identifying part 24 does not have to identify coordinate values of intersection points for all target angular ranges. For example, the line-candidate identifying part 24 may just identify coordinate values of intersection points for the target angular ranges that correspond to the gradient directions θ indicated by the combined edge gradient image, out of the "M" target angular ranges. For example, for each target angular range, the line-candidate identifying part 24 may count the number of times the gradient direction θ indicating an angle within the target angular range appears in the combined edge gradient image, and may identify coordinate values of intersection points for the target angular ranges having the "1st" to "L-th" ("L" is for example "4") highest appearance frequency. Additionally, for example, the line-candidate identifying part 24 may identify the gradient direction θ of each of "L" predetermined target pixels in the combined edge gradient image, and may identify coordinates values of intersection points for the target angular ranges that include the identified edge gradient directions θ. This allows the line candidates l to be rapidly identified while reducing the influence of noise.

Figure 8:
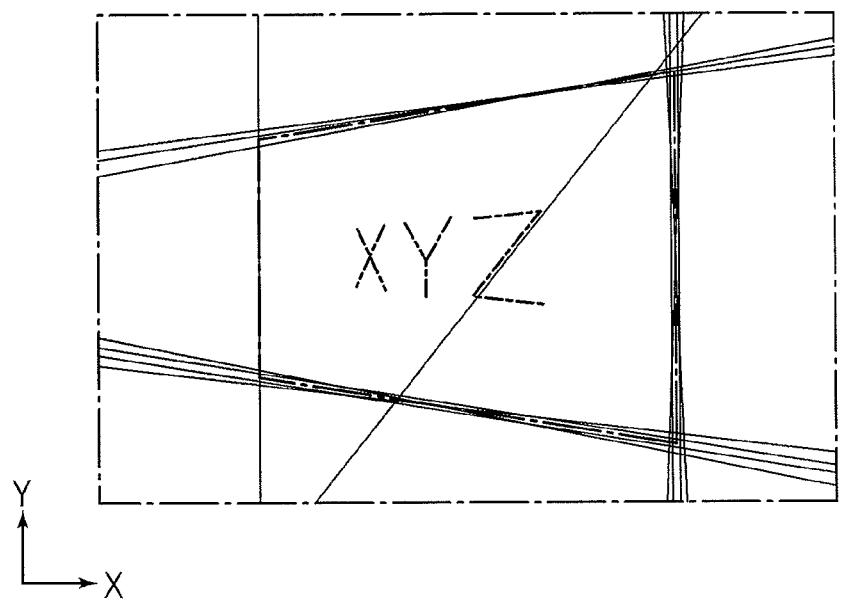
FIG. 8 is a diagram conceptually illustrating identified line candidates.

FIG. 8 conceptually illustrates identified line candidates. One solid line represents one line candidate l.

For each line candidate l, the line-probability calculating part 26 (line-probability calculating part) calculates a line probability P1 that indicates a probability that the line candidate l is a line that constitutes the contour of the subject region 16.

More specifically, when calculating the line probability P1 of a given line candidate l (hereinafter, referred to as a line candidate lx), the line-probability calculating part 26 calculates the line probability P1 on the basis of edge intensities I of pixels located near the line candidate lx in the combined edge intensity image, gradient directions θ of pixels located near the line candidate lx in the combined edge gradient image, and pixel values of pixels located near the line candidate lx in the captured image.

More specifically, the line-probability calculating part 26 reads out edge intensities I of pixels located at or within a reference distance S from the line candidate lx (hereinafter, referred to as first reference pixels) from the combined edge intensity image, and generates evaluation information regarding the uniformity of the read out edge intensities I. That is, the line-probability calculating part 26 calculates a reciprocal D1 of a variance of the read out edge intensities I as the evaluation information. The line-probability calculating part 26 also reads out gradient directions θ of the first reference pixels from the combined edge gradient image, and generates evaluation information regarding the uniformity of the read out gradient directions θ. That is, the line-probability calculating part 26 calculates a reciprocal D2 of a variance of the read out gradient directions θ or of a variance of differences between the read out gradient directions θ and the normal or extending direction of the line candidate lx as the evaluation information.

Additionally, the line-probability calculating part 26 reads out pixels values of the first reference pixels from the captured image, and generates evaluation information regarding the uniformity of color space distances represented by the Y-values, the Cb-values, and the Cr-values included in the read out pixel values. More specifically, the line-probability calculating part 26 calculates a color space distance represented by each of the read out pixel values, and calculates a reciprocal D3 of a variance of the calculated color space distances as the evaluation information.

The reciprocals D1 to D3 indicate the uniformity of feature values of the first reference pixels. More specifically, the reciprocal D1 indicates the uniformity of the edge intensities I of the first reference pixels, the reciprocal D2 indicates the uniformity of the gradient directions θ of the first reference pixels, and the reciprocal D3 indicates the uniformity of the color space distances of the first reference pixels.

The line-probability calculating part 26 also reads out pixel values of the first reference pixels from the combined edge image, identifies the number of first reference pixels having the read out pixel value "1", i.e., the number of first reference pixels serving as edge pixels, and calculates a ratio R of the identified value to the total number of first reference pixels. Additionally, on the basis of the pixel values of the first reference pixels read out from the combined edge image, the line-probability calculating part 26 identifies the number C of "first reference pixels having the pixel value "1" (first reference pixels serving as edge pixels)" that consecutively appear when the line candidate lx is scanned. The value C indicates information regarding a distribution of the first reference pixels that serve as edge pixels.

The line-probability calculating part 26 calculates the line probability P1 of the line candidate lx on the basis of the reciprocals D1, D2, and D3, the ratio R, and the value C. In this exemplary embodiment, the line-probability calculating part 26 multiples the reciprocals D1, D2, and D3, the ratio R, and the value C by predetermined weighting coefficients and adds the resulting products, thereby calculating the line probability P1.

Feature values (gradient directions θ, edge intensities I, or color space distances) of pixels located near a line that constitutes the contour of the subject region 16 are substantially uniform. Accordingly, it is considered that the higher the uniformity of the feature values of the pixels located near the line candidate lx, the higher the possibility that the line candidate lx is a line that constitutes the contour of the subject region 16. In this regard, the image processing apparatus 2 calculates the line probability P1 in consideration of the uniformity of the feature values of the first reference pixels. Since the possibility that the line candidate lx is a line that constitutes the contour of the subject region 16 is evaluated in consideration of the uniformity of the feature values of the first reference pixels, subsequent detection of the subject region 16 is more likely to be performed at high accuracy.

In addition, most pixels located near a line that constitutes the contour of the subject region 16 are edge pixels. Accordingly, it is considered that the more the edge pixels are located near the line candidate lx, the higher the possibility that the line candidate lx is a line that constitutes the contour of the subject region 16. In this regard, the image processing apparatus 2 calculates the line probability P1 in consideration of the number of edge pixels located near the line candidate lx and the length of the run of the edge pixels located near the line candidate lx. Since the possibility that the line candidate lx is a line that constitutes the contour of the subject region 16 is evaluated in consideration of these pieces of information, subsequent detection of the subject region 16 is more likely to be performed at high accuracy.

The subject-region detecting unit 22 then detects the subject region 16 on the basis of the line probabilities P1 calculated by the line-probability calculating part 26.

More specifically, the region-candidate choosing part 28 chooses the line candidates l having the "1st" to "Q-th" ("Q" is for example "10") largest line probability P1 from the plural line candidates l identified by the line-candidate identifying part 24. The region-candidate choosing part 28 chooses rectangular regions each surrounded by four line candidates l that are selected from the "Q" chosen line candidates l, as region candidates K serving as candidates of the subject region 16. Here, as many region candidates K as the number of combinations of four line candidates l are chosen.

For each of the region candidates K chosen by the region-candidate choosing part 28, the region-probability calculating part 30 calculates a region probability P2 that indicates a probability that the region candidate K is the subject region 16, on the basis of the line probabilities P1 of the line candidates l that constitute the region candidate K.

In this exemplary embodiment, when calculating the region probability P2 of a given region candidate K (hereinafter, referred to as a region candidate Kx), the region-probability calculating part 30 first calculates, as an index E1, an average of the line probabilities P1 of the four line candidates l that constitute the region candidate Kx.

The region-probability calculating part 30 also calculates, as an index E2, a ratio of a shorter side to a longer side of a circumscribed rectangle of the region candidate Kx. The region-probability calculating part 30 may use, as the index E2, whether or not the region candidate Kx has an apex having an angle that is smaller than or equal to a reference angle (e.g., five degrees).

Additionally, the region-probability calculating part 30 calculates a feature average for each of two adjacent sides that constitute the region candidate Kx, and calculates the similarity between the two calculated feature averages as the index E2.

For example, when calculating the feature average of one side (hereinafter, referred to as a side e) of the two adjacent sides, the region-probability calculating part 30 reads out, from the combined edge intensity image, pixel values (i.e., edge intensities I) of pixels located at or within a reference distance S from an intersection point of the two adjacent sides and also from the side e (hereinafter, referred to as second reference pixels). The region-probability calculating part 30 calculates, as the feature average, an average of the read out edge intensities I. Alternatively, the region-probability calculating part 30 reads out pixel values of the second reference pixels from the captured image, and calculates an average of Y-values, Cb-values, or Cr-values included in the read out pixel values as the feature average. Alternatively, the region-probability calculating part 30 generates a grayscale image of the captured image, reads out pixel values of the second reference pixels from the grayscale image, and calculates an average of the read out pixel values as the feature average.

Further, the region-probability calculating part 30 reads out pixel values of pixels included in the region candidate Kx from the captured image, and generates evaluation information regarding the uniformity of the read out pixel values. For example, the region-probability calculating part 30 calculates a reciprocal of a variance of Y-values included in the read out pixel values, as an index E3 serving as the evaluation information. The region-probability calculating part 30 may calculate spatial frequencies of the read out pixel values as the index E3.

Moreover, the region-probability calculating part 30 performs an optical character recognition (OCR) process, thereby detecting character images, which is included in the captured image and represent characters, in the region candidate Kx. The region-probability calculating part 30 sets the number of detected character images as an index E4.

Thereafter, the region-probability calculating part 30 multiplies the indices E1 to E4 by predetermined weighting coefficients and adds the multiplied indices E1 to E4, thereby calculating the region probability P2 of the region candidate Kx.

In this way, the region probability P2 is calculated in consideration of the line probabilities P1 of the line candidates l that constitute the region candidate Kx. Since the possibility that the region candidate Kx is the subject region 16 is evaluated in consideration of the line probabilities P1 of the line candidates l that constitute the region candidate Kx, subsequent detection of the subject region 16 is more likely to be performed at high accuracy.

Features of pixels located near two adjacent sides that constitute the contour of the subject region 16 are substantially alike. Accordingly, if features of pixels located near two adjacent sides that constitute the region candidate Kx are alike, it is considered that the region candidate Kx is highly likely to be the subject region 16. In this regard, the image processing apparatus 2 calculates the region probability P2 in consideration of the similarity between the features of the pixels located near the two adjacent sides that constitute the region candidate Kx. Since the possibility that the region candidate Kx is the subject region 16 is evaluated in consideration of the similarity between the features of the pixels located near the two adjacent sides that constitute the region candidate Kx, subsequent detection of the subject region 16 is more likely to be performed at high accuracy.

In addition, when the subject is the whiteboard 14, pixels in the subject region 16 have substantially uniform features. Accordingly, if pixels in the region candidate Kx have substantially uniform features, it is considered that the region candidate Kx is highly likely to be the subject region 16. In this regard, the image processing apparatus 2 calculates the region probability P2 in consideration of the uniformity of the features of the pixels located in the region candidate Kx. Since the possibility that the region candidate Kx is the subject region 16 is evaluated in consideration of the uniformity of the features of the pixels located in the region candidate Kx, subsequent detection of the subject region 16 is more likely to be performed at high accuracy.

Furthermore, when the subject is the whiteboard 14, the subject region 16 often includes many character images. Accordingly, if the region candidate Kx includes many character images, it is considered that the region candidate Kx is highly likely to be the subject region 16. In this regard, the image processing apparatus 2 calculates the region probability P2 in consideration of the number of character images included in the region candidate Kx. Since the possibility that the region candidate Kx is the subject region 16 is evaluated in consideration of the number of character images included in the region candidate Kx, subsequent detection of the subject region 16 is more likely to be performed at high accuracy.

After the calculation of the region probability P2 of each region candidate K completes in the aforementioned manner, the region selecting part 32 detects the region candidate K having the largest region probability P2, and selects the detected region candidate K as the subject region 16.

As described above, the image processing apparatus 2 uses not only edge pixels indicated by the combined edge image but also the combined edge intensity image and the combined edge gradient image in detection of the subject region 16. Accordingly, the largest edge intensity I of the edge intensities I indicated by the first to third color separation images and the gradient direction θ indicated by the color separation image including the largest edge intensity I are selectively used in detection of the subject region 16. As a result, the accuracy of detecting the subject region 16 improves.

After the subject region 16 is detected, the geometric-transform-parameter calculating unit 34 enlarges the subject region 16, and calculates coordinate values of four apices of the subject region 16 that has been enlarged (hereinafter, referred to as the enlarged subject region).

An area of the aforementioned base image that is occupied by the image of the whiteboard 14 corresponds to the enlarged subject region.

The geometric-transform-parameter calculating unit 34 compares the calculated coordinate values of each apex with coordinate values of the corresponding apex of a rectangular region that is previously set in the base image, thereby calculating a geometric transform parameter for geometrically transforming the enlarged subject region into the rectangular region. The geometric transform parameter includes so-called a parameter of projection transform.

The geometric-transform processing unit 36 then extracts the image of the enlarged subject region, i.e., the image of the whiteboard 14 included in the base image, from the base image. The geometric-transform processing unit 36 geometrically transforms the extracted image in accordance with the geometric transform parameter calculated by the geometric-transform-parameter calculating unit 34, and displays the geometrically transformed image on the display 10. As a result, an image of the whiteboard 14 viewed from the front is displayed on the display 10.

Exemplary embodiments of the present invention are not limited to the aforementioned ones.

For example, the region-probability calculating part 30 may calculate, as the index E2, a ratio of the shortest side of the region candidate Kx to the longest side of the region candidate Kx instead of the ratio of the shorter side to the longer side of the circumscribed rectangle of the region candidate Kx.

Additionally, the subject does not have to be the whiteboard 14 and may be, for example, a paper medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a calculating unit that generates, for each of a plurality of color separation images, an edge gradient image that comprises a gradient direction for each pixel in the color separation image and an edge intensity image that comprises an edge intensity for each pixel in the color separation image, the plurality of color separation images resulting from separation of a color captured image into a plurality of color components;
    an edge-position detecting unit that, for each color separation image, detects edge pixels on the basis of the edge gradient image and the edge intensity image of the color separation image, and for each color separation image, generates a binary edge image indicating the detected edge pixels;
    a combining unit that generates a combined edge image that combines the plurality of binary edge images; a combined edge intensity image that combines the edge intensity images, and a combined edge gradient image that combines the edge gradient images; and a subject-region detecting unit that detects a subject region in the color captured image on the basis of the combined edge intensity image, the combined edge gradient image, and the edge pixels indicated by the combined edge image.

2. The image processing apparatus according to claim 1, wherein the subject-region detecting unit includes:
a line-candidate identifying part that performs Hough transform on each edge pixel indicated by the combined edge image to identify a plurality of candidates of lines that constitute a contour of the subject region; and
a line-probability calculating part that calculates, for each of the plurality of candidates, a probability that the line candidate is a line that includes a contour of the subject region on the basis of the edge intensities of the combined edge intensity image, the gradient directions of the combined edge gradient image, and pixel values in the color captured image, and
wherein the subject-region detecting unit detects the subject region on the basis of the probabilities calculated by the line-probability calculating part.

3. The image processing apparatus according to claim 2, wherein the line-probability calculating part generates, for each of the plurality of candidates, evaluation information regarding uniformity of the edge intensities for pixels located at or within a reference distance from the candidate, and calculates the probability of the candidate on the basis of the generated evaluation information.

4. The image processing apparatus according to claim 1, wherein the subject-region detecting unit includes:
a line-candidate identifying part that performs Hough transform on each edge pixel indicated by the combined edge image to identify a plurality of candidates of lines that constitute a contour of the subject region; and
a line-probability calculating part that calculates, for each of the plurality of candidates, a probability that the candidate is a line that includes a contour of the subject region on the basis of the gradient directions of the combined edge gradient image for pixels located at or within a reference distance from the candidate, and
wherein the subject-region detecting unit detects the subject region on the basis of the probabilities calculated by the line-probability calculating part.

5. The image processing apparatus according to claim 4, wherein the line-probability calculating part generates, for each of the plurality of candidates, evaluation information regarding uniformity of the gradient directions for pixels located at or within a reference distance from the candidate, and calculates the probability of the candidate on the basis of the generated evaluation information.

6. The image processing apparatus according to claim 2, wherein the line-candidate identifying part identifies the plurality of candidates of lines that constitute the contour of the subject region, on the basis of results of a Hough transform in an angular range corresponding to the gradient directions.

7. The image processing apparatus according to claim 4, wherein the line-candidate identifying part identifies the plurality of candidates of lines that constitute the contour of the subject region, on the basis of results of a Hough transform in an angular range corresponding to the gradient directions.

8. An image processing method comprising:
generating, for each of a plurality of color separation images, an edge gradient image that comprises a gradient direction for each pixel in the color separation image and an edge intensity image that comprises an edge intensity for each pixel in the color separation image, the plurality of color separation images resulting from separation of a color captured image into a plurality of color components;
detecting edge pixels on the basis of the edge gradient image and the edge intensity image of the color separation image, and for each color separation image, generating a binary edge image indicating the detected edge pixels;
generating a combined edge image that combines the plurality of binary edge images; a combined edge intensity image that combines the edge intensity images, and a combined edge gradient image that combines the edge gradient images; and
detecting a subject region in the color captured image on the basis of the combined edge intensity image, the combined edge gradient image, and the edge pixels indicated by the combined edge image.

9. A non-transitory computer readable medium storing a program causing a computer to execute a process for image processing, the process comprising:
generating, for each of a plurality of color separation images, an edge gradient image that comprises a gradient direction for each pixel in the color separation image and an edge intensity image that comprises an edge intensity for each pixel in the color separation image, the plurality of color separation images resulting from separation of the color captured image into a plurality of color components;
detecting edge pixels on the basis of the edge gradient image and the edge intensity image of the color separation image, and for each color separation image, generating a binary edge image indicating the detected edge pixels;
generating a combined edge image that combines the plurality of binary edge images; a combined edge intensity image that combines the edge intensity images, and a combined edge gradient image that combines the edge gradient images; and
detecting a subject region in the color captured image on the basis of the combined edge intensity image, the combined edge gradient image, and the edge pixels indicated by the combined edge image.

10. An image processing apparatus comprising:
a memory that stores computer-executable instructions to implement:
an edge detecting unit that performs a color separation process to separate a color image into a plurality of color separation images in which pixel values of pixels represent color component values of pixel values of corresponding pixels in the color image;
a calculating unit that calculates, for each of the plurality of color separation images, (i) a gradient direction of an edge gradient at each pixel in color separation images and (ii) an edge intensity at each pixel in the color separation images;
an edge-position detecting unit that detects edge pixels in the plurality of color separation images, based on the gradient directions of the edge gradients and the edge intensities;
a combining unit that combines the plurality of edge pixels in the plurality of color separation images as a combined image and identifies (i) a gradient direction of the edge gradient at the pixel in the combined image corresponding to a gradient direction of the edge gradient among the plurality of color separation images that includes the largest edge intensity at the pixel and (ii) an edge intensity at the pixel in the combined image corresponding to an edge intensity of the edge intensities among the plurality of color separation images that includes the largest edge intensity at the pixel; and a subject-region detecting unit that detects a subject region on the basis of the edge pixels in the combined image, the identified gradient directions of the edge gradients, and the identified edge intensities; and a processor that executes the computer-executable instructions to control the image processing apparatus to implement the edge detecting unit, the calculating unit, the edge-position detecting unit, the combining unit, and the subject-region detecting unit.

11. The image processing apparatus according to claim 10, wherein the subject-region detecting unit includes:

a line-candidate identifying part that performs Hough transform on the edge pixels detected by the edge-position detecting unit, thereby identifying a plurality of candidates of lines that constitute a contour of the subject region; and a line-probability calculating part that calculates, for each of the plurality of candidates, line probability information on the basis of pixel values for pixels located at or within a reference distance from the candidate, the line probability information representing a probability that the candidate identified by the line-candidate identifying part is a line that constitutes the contour of the subject region, and wherein the subject-region detecting unit detects the subject region on the basis of the pieces of line probability information calculated by the line-probability calculating part.

12. The image processing apparatus according to claim 11, wherein the line probability calculating part generates, for each of the plurality of candidates, evaluation information regarding uniformity of the color space distances represented by the Y-values, the Cb-values, and the Cr-values included in the pixel values for the pixels located at or within the reference distance from the candidate, and calculates the line probability information of the candidate on the basis of the generated evaluation information.

* * * * *